3,042,533
METHOD OF STERILIZATION
John E. W. McConnell, 149 Gordon Road, Walnut Creek, Calif., and Charles P. Collier, 222 W. Pueblo St., Santa Barbara, Calif.
Filed Dec. 6, 1955, Ser. No. 551,257
9 Claims. (Cl. 99—182)

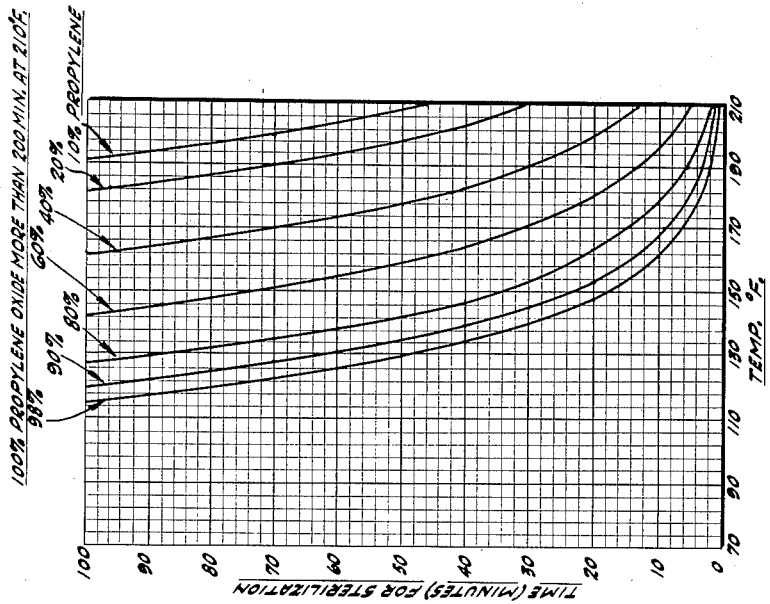
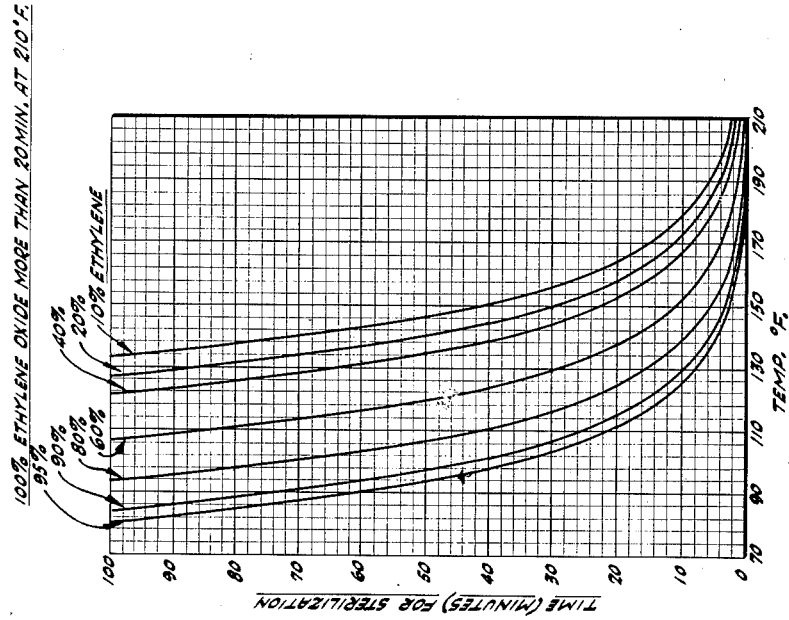

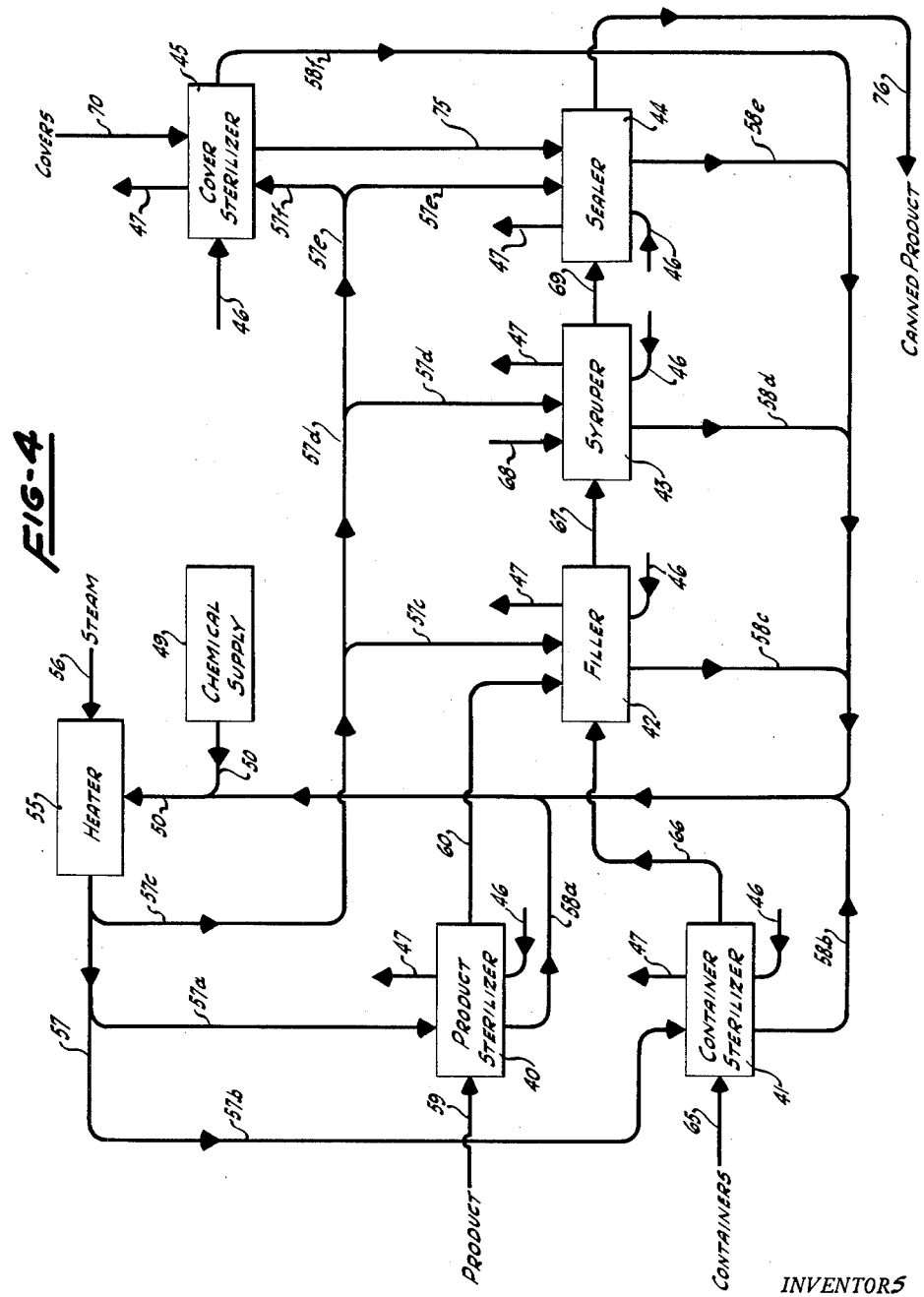

This invention relates to a method of sterilization. It is applicable to the sterilization of food products; to biological preparations; to handling and processing equipment (such as pipes, tubes and fillers) for such products and preparations; and to containers and closures for the same. The method has particular application to sterile or aseptic canning of foods.

In the sterile or aseptic canning of foods or packaging of biological preparations, it is necessary not only to sterilize the food or biological preparation but also the containers and the closures for the containers. It is also necessary to conduct the filling and the closing or sealing operations under sterile conditions.

To avoid repetition, reference hereinafter is made primarily to food and its processing and canning, but it will be understood that the invention is also applicable to biological preparations and other products which it is desired to package and sterilize.

An advantage of sterile or aseptic canning is that it avoids the necessity of sterilizing canned foods in retorts after it has been placed in containers and the containers have been sealed. Such retorting has a deleterious effect on flavor, so much so that certain food products, e.g., whole milk, are not commercially acceptable in canned form. This is due to the fact that retorting requires exposure of 20 minutes or more at temperatures of 240° F. or more to achieve sterilization.

The method of aseptic or sterile canning which is most widely used today employs a dry gas such as superheated steam or other inert gases as the sterilizing medium. To avoid mechanical valving difficulties, the steam is employed at high temperature (e.g., about 300° to 475° F.) and at atmospheric pressure or at a pressure slightly above atmospheric.

In the prior steam process above-mentioned, containers are caused to pass continuously through a tunnel into which sterilizing steam is introduced; covers are passed through a sterilizing chamber into which steam is introduced; and presterilized food product (also precooked where cooking is required) is supplied to a filler which is filled with steam. The filled, sterile containers and sterile covers are conveyed to a closing machine, which is filled with steam, and the covers are applied.

This procedure is disadvantageous, among other reasons, because it requires relatively high temperatures with consequent high heat consumption, because it requires a complicated control system and because it is not adapted to high speed production.

Heretofore, ethylene oxide and propylene oxide have been used for purposes of preservation and partial sterilization. Thus Baerwald U.S. Patent No. 2,370,678, granted in 1945 and entitled "Fruit Preservation Method," introduces ethylene oxide into containers of food, e.g., into cellophane or Pliofilm bags. The bags are sealed and held at room temperature, and the ethylene oxide accomplishes sterilization in the sealed bags. This method may be satisfactory for the preservation of dried fruits and similar products in which the spoilage organisms are less resistant yeasts and molds, but it would not be satisfactory for the purpose of killing the spores of more heat resistant organisms which cause spoilage of canned foods.

Ethylene oxide has also been used to sterilize spices and similar dry foods by exposure to ethylene oxide at 70° to 240° F. But this procedure requires a vacuum, involves batch operation and is time consuming.

Heretofore, to our knowledge, no practical chemical method of sterilization has been provided, which is adapted to high speed continuous canning operations, which employs a chemical sterilizing agent that is safe and is capable of sterilizing containers and covers in a short time, and at relatively low temperatures of the order of 212° F.

It is an object of the present invention to provide an improved method of sterilization.

It is another object of the invention to provide an improved method of sterilization adapted for aseptic canning of food products and the like.

Another object of the invention is to provide an improved method of sterilization employing a chemical agent rather than high temperatures as a sterilizing medium.

A still further object of the invention is to provide a chemical sterilization method which can be carried out effectively at relatively low temperatures and which is adapted to high speed operations.

These and other objects of the invention will be apparent from the ensuing description and the appended claims.

Certain forms of the invention are illustrated by way of example in the accompanying drawings, in which FIGURE 1 is a graph showing the effect of temperature and composition of ethylene oxide-water vapor mixtures used for sterilization.

FIGURE 2 is a similar graph with respect to propylene oxide-water mixtures.

FIGURE 4 is a diagrammatic flow sheet showing an adaptation of the process of our invention to the aseptic canning of food products.

Figure 3:
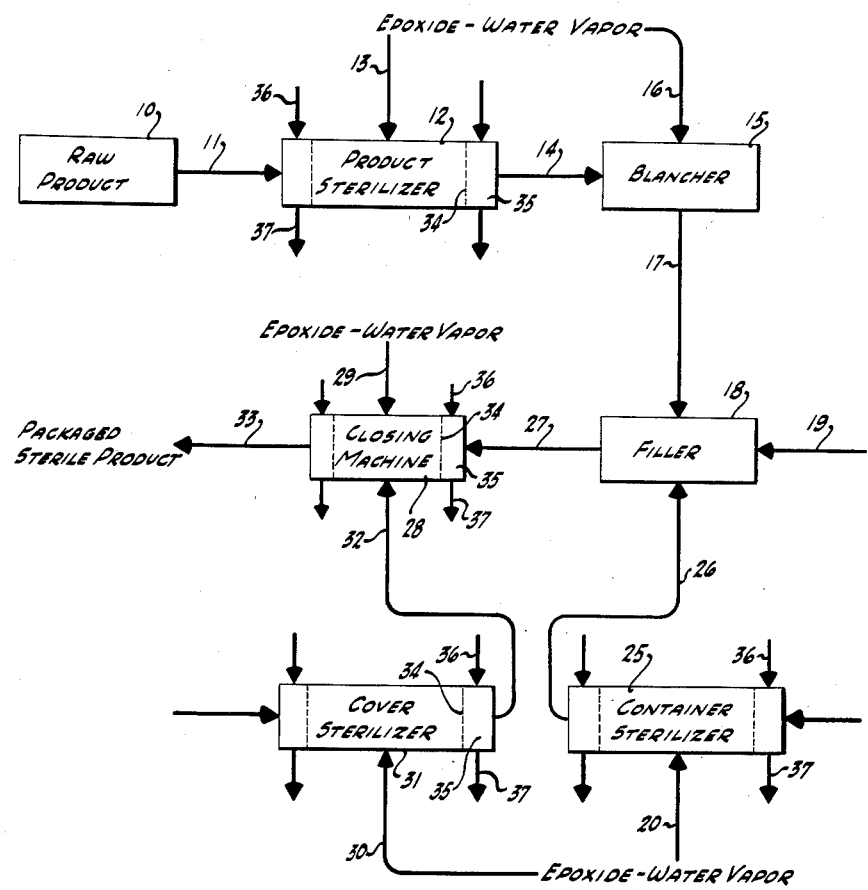
FIGURE 3 is a diagrammatic flow sheet showing an adaptation of the process of our invention to the sterilization of and the sterile packaging of raw food products.

We have discovered that gaseous mixtures of water vapor and epoxides and aqueous solutions of epoxides are effective sterilizing media of general utility and have particular utility in the aseptic or sterile canning or packaging of food, biological preparations and the like; and that such media are effective sterilizing agents at low temperatures and with short contact times of the order a fraction of a minute to two or three minutes. Preferably the contact time does not exceed about 10 minutes, and most advantageously it does not exceed about 3 minutes.

The epoxide is preferably used in vapor form in admixture with water vapor but aqueous solutions may also be used.

The preferred epoxides are ethylene oxide and propylene oxide which have the following structural formulae:

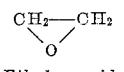
Ethylene oxide

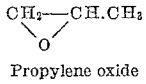
Propylene oxide

However, higher homologues may be used, such as isobutylene oxide,

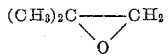

and derivatives such as styrene oxide,

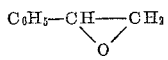

Also, isomers may be employed, in which a four-membered oxy ring replaces a three-membered oxy ring. Also such compounds as epichlorhydrin, ethylene imine and ethylene sulfide may be used which have the characteristic heterocyclic ring nucleus

wherein X is oxygen, nitrogen or sulphur. Preferably, an epoxide or the like is used which boils below 212° F., or which at least has a substantial vapor pressure at 212° F.

The proportions of epoxide and water or water vapor may vary widely, as will be apparent from FIGURES 1 and 2, which are described hereinafter. Thus, ethylene oxide-water vapor mixtures varying from 10% ethylene oxide and 90% water vapor to 95% ethylene oxide and 5% water vapor have been employed for sterilization and have been found to be effective. Likewise, propylene oxide-water vapor mixtures varying from 40% propylene oxide and 60% water to 98% propylene oxide and 2% water vapor have been employed effectively for sterilization.

It is an important advantage of the media of the invention that they effect sterilization at relatively low temperatures, e.g., 212° F. or less, in relatively short periods of time of the order of a few seconds to a few minutes. By way of comparison, pure water vapor (zero percent epoxide) in the form of steam requires either high temperatures (e.g., 400° F.) or long exposure times (of the order of an hour or more), or both. Pure epoxide (zero percent water) likewise requires a high temperature and/or a longer exposure time to sterilize dry containers, covers, etc., and to sterilized dry foods. If water is present in or on the product or article to be sterilized, it is feasible to use pure epoxide, by reason of the fact that epoxide-water mixtures form in situ.

The following example will serve further to illustrate the practice and advantages of the invention.

*Example 1.*—The test organisms were spores of NCA FS1518 and NCA PA3679. (These are spore designations employed by the National Canners Association. The strains are standardized and are accepted as standards for sterilization investigation.)

In each instance, an inoculum of 10,000 to 100,000 spores was placed on a metal disc and the inoculated disc was placed in a sealed, evacuated 307 x 113 tin can containing the sterilizing medium. Each sealed can was then heated by immersion in a water bath. Correction was made for the time required to bring the can and contents up to ambient temperature. At the conclusion of each exposure, the exposed disc was cultured in glucose tryptone or liver broth. Results are given in Table I.

TABLE I

*Time (in Minutes) to Destroy 10,000 to 100,000 Spores[1] of FS 1518 and PA 3679 for Various Concentrations of Epoxides and Water Vapor, in Sealed Containers*

| | Temperature (° F.) | | | | |
|---|---|---|---|---|---|
| | 130 | 150 | 170 | 190 | 210 |
| Percent Ethylene oxide (balance= $H_2O$ vapor): | | | | | |
| 0 (moist heat)[2] | (spores not destroyed) | | >60,000 | >6,000 | >600 |
| 10 | 125 | 47 | 17.5 | 6.5 | 2.6 |
| 20 | 90 | 33 | 12.5 | 4.7 | 1.7 |
| 40 | 62 | 21 | 7 | 2.4 | 0.8 |
| 60 | 28 | 10 | 3.4 | 1.2 | 0.4 |
| 80 | 14 | 4.8 | 1.8 | 0.6 | 0.2 |
| 90 | 8.7 | 3 | 1.1 | 0.4 | 0.1 |
| 95 | 7.5 | 2.6 | 0.9 | 0.3 | 0.1 |
| 100 | | >150 | >8.0 | >5.0 | |
| Percent Propylene oxide (balance= $H_2O$ vapor): | | | | | |
| 0 (moist heat)[2] | (spores not destroyed) | | >60,000 | >6,000 | >600 |
| 10 | 1,250 | 510 | 240 | 105 | 46 |
| 20 | 810 | 360 | 160 | 70 | 31 |
| 40 | 375 | 160 | 70 | 30 | 13 |
| 60 | 185 | 74 | 31 | 13.1 | 5.6 |
| 80 | 90 | 36 | 14.4 | 5.8 | 2.3 |
| 90 | 63 | 23.5 | 8.8 | 3.3 | 1.2 |
| 93 | 47 | 17 | 6.1 | 2.2 | 1.0 |
| 100 | >25,000 | >5,000 | >1,000 | >300 | >200 |

[1] Spores dried on metal discs.
[2] Obtained by extrapolation from destruction rates at higher temperatures.

Referring now to FIGURES 1 and 2, FIGURE 1 is a graph showing temperature-time curves for ethylene oxide-water vapor mixtures of varying proportions. Ordinates represent the time to destroy the test organism (inoculums of 10,000 to 100,000 spores of NCA FS1518 and NCA PA3679) and abscissae represent the temperature. Standard technique similar to that of Example 1 was employed. FIGURE 2 is a similar graph for propylene oxide-water vapor mixtures.

As will be seen optimum conditions for ethylene oxide were proportions of about 60 to 95% ethylene oxide and temperatures of about 170 to 210° F. In the case of propylene oxide, optimum conditions were proportions of propylene oxide of about 80 to 98% and temperatures of about 190 to 210° F. In both cases, the pure epoxide required excessive time even at 210° F., and low concentrations of epoxide required rather long periods of time.

Epoxide-water vapor mixtures have been used with other organisms (e.g., *Cl. botulinum* spores, Types A and B). They have been used in sealed containers (as in Example 1) and also in chambers through which an epoxide-water vapor mixture was caused to flow at atmospheric pressure. In all cases the same results were noted; i.e., mixtures of epoxide and water vapor were found to be much more effective than pure epoxide or pure steam, and to effect sterilization at much lower temperatures. Epoxides have been used to sterilize 3/16" and 3/8" thicknesses of agar medium in glass cups, and to sterilize food products in glass jars and glass cups inoculated with PA3679, *B. polymyxa* and FS1518 and in such cases 100% ethylene oxide and 100% propylene oxide were found to be superior because they picked up the optimum amount of moisture from the agar medium or food.

The process of the invention may be applied to such varied uses as sterilization of foods, whether liquid or solid, homogeneous or discrete; sterilization of glass and metal containers and covers; surface sterilization of food processing equipment; surface sterilization of fresh vegetables to increase shelf life; sterilization of flexible containers, such as paper, plastic, Pliofilm or cellophane containers; sterilization of pharmaceuticals and surgical supplies, etc. The process of the invention may be also used as an aid to sanitation to reduce microbial populations on processing equipment in general, and to sterilize soils in the field. Raw products can be sterilized in the manner illustrated in FIGURE 3.

Referring to FIGURE 3, a raw product such as potatoes, tomatoes, fruit or meat contained in a hopper or storage unit 10 is introduced at 11 to a product sterilizer 12 which is supplied with epoxide-water vapor mixture at 13. Sterilized product leaves at 14 and is conveyed to a blancher 15 which is maintained sterile by epoxide-water vapor mixture introduced at 16. Blanched sterilized product passes at 17 to a filler 18 which is maintained sterile by epoxide-water vapor mixture introduced at 19. Epoxide-water vapor mixture is introduced at 20 to a container sterilizer 25 and sterilized containers are supplied at 26 to the filler 18. Filled sterile containers pass at 27 to a closing apparatus 28 which is maintained sterile by epoxide-water vapor mixture supplied at 29. Epoxide-water vapor mixture is supplied at 30 to a cover or closure sterilizer 31 and sterilized covers or closures (e.g., lids or staples) are supplied at 32 to the closing apparatus. Closed, sealed, sterile containers filled with sterile product leave the system at 33.

It may be desirable to add a steam "curtain" feature to the apparatus of FIGURE 3. Thus, the product, container and cover sterilizers 12, 25 and 31 and closing machine 28 may be provided with a curtain or baffle 34 near (but spaced from) each end to provide a space 35 at each end. Steam is supplied at 36 and is vented at 37. The baffles 34 are designed to allow passage of product, containers or covers, as the case may be but to shield the inner part of the apparatus from the steam atmosphere or curtains in the end spaces 35. The steam curtains provided in this manner serve to prevent ingress of nonsterile air into the system; excess loss of epoxides and diffusion of epoxides if steam is used in the conveyor lines.

Referring now to FIGURE 4 there is shown diagrammatically a complete system for sterile or aseptic canning of a food product consisting of discrete particles, for example, peas or corn. The system there illustrated comprises a product sterilizer 40, a container sterilizer 41, a filler 42, a syruper 43, a sealer or closing element 44 and a cover sterilizer 45. Each of these elements may be initially sterilized by admitting a sterile gas such as steam or previously heated and sterile air through an inlet line 46 under a slight superatmospheric pressure, allowing the same to escape through a vent line 47. It will be understood that the method of sterilization accomplished in the system illustrated in FIGURE 4, as described in detail hereinafter, is a chemical method employing a mixture of epoxide and water vapor as described hereinabove, and that the introduction of steam or other sterile gas through the inlet lines 46 and venting thereof through the vent lines 47 is for the purpose of initially sterilizing the system. Alternatively, the system may be sterilized initially by epoxide-water vapor mixture. At all times it is preferred to maintain a slight superatmospheric pressure so that leakage is from the inside of the system outwardly to prevent influx of nonsterile air.

A chemical sterilizing medium, i.e., an epoxide, is maintained in a chemical supply storage vessel 49 and is supplied through a line 50 to a heater 55 which is supplied with steam through a line 56. The mixture of steam and epoxide vapor are heated by any suitable means such as steam coils in the heater 55 and the appropriately heated mixture of epoxide and water vapor leaves through a line 57. By suitable control means, which are well known in the art and require no detailed description herein, the concentration or proportions of epoxide and water vapor and the temperature thereof flowing through the outlet line 57 may be subjected to continuous control as desired. The epoxide-water vapor mixture in line 57 is also preferably maintained under a slight superatmospheric pressure.

Branch lines 57a, 57b, 57c, 57d, 57e and 57f connect the line 57 with the product sterilizer 40, the container sterilizer 41, the filler 42, the syruper 43, the sealer 44 and the cover sterilizer 45, respectively. It will be understood that suitable means may be provided in each of the various elements described, i.e., the product sterilizer 40, the container sterilizer 41, etc., to promote intimate contact of the sterilizing medium with the food product, the containers, the covers, etc. Thus, in the case of containers, nozzles may be employed to direct jets of the vapor mixture into the containers as well as onto their exterior surfaces, and the containers may be caused to spin, to promote uniform and intimate contact between the sterilizing medium and the container.

Effluent sterilizing medium is removed from the several elements through gathering lines, i.e., through the line 58a from the product sterilizer 40, the line 58b from the container sterilizer 41, the line 58c from the filler 42, line 58d from the syruper 43, the line 58e from the sealer 44 and the line 58f from the cover sterilizer 45. These gathering and return lines are united with the line 50 and serve to recycle the sterilizing medium. From time to time it may be desirable to bleed a portion of the circulating medium and to maintain the desired purity and proportion of epoxide and water vapor. Make-up epoxide and steam are added through lines 50 and 56, respectively.

Meanwhile, food products such as peas or corn are introduced into the product sterilizer 40 through a line 59. Any suitable conveyor means, preferably of continuous variety, is employed for this purpose and it will be understood that the inlet to the product sterilizer 40 is not sealed but is closed off loosely with baffles (not shown) to allow freedom of entry of the nonsterile food product without permitting free access of nonsterile air into the product sterilizer. Meanwhile, of course, the slight superatmospheric pressure prevailing within the product sterilizer will cause a leakage outwardly of the sterile medium in the product sterilizer 40. In the product sterilizer 40, the product is conveyed through a sterilizing chamber by any suitable means, such as an extension of the inlet means shown at 59. The length of residence of the food product in the product sterilizer 40 is sufficient to accomplish complete sterilization of the product. It then passes by conveyor means generally indicated as 60 to the filler 42. It will be understood that the conveyor means 60, which is shown diagrammatically in FIGURE 4, will be enclosed and that it is preferably supplied with sterile gas, such as steam or sterile air, to keep it filled at all times with a sterile atmosphere under slight superatmospheric pressure to prevent contamination of the sterilized product.

Containers such as tin cans or glass jars are meanwhile continuously introduced by suitable conveyor means, generally indicated as 65, to the container sterilizer 41. The containers are sterilized in the container sterilizer 41 in a manner similar to the product sterilization in product sterilizer 40. Preferably jets of sterilizing medium are directed onto the outer surfaces of and into the interior of each container to promote contact between the sterilizing medium and the containers. Baffle means (not shown) are also provided at the inlet of the container sterilizer, as in the case of the product sterilizer. Sterile containers are conveyed by enclosed conveyor means 66 to the filler 42. It will be understood that the conveyor 66 is preferably maintained full of a sterile gas, such as steam, sterile air or steam-epoxide mixture as in the case of the conveyor 60.

The filler 42 may be of any desired type, several of which are well known, to continuously fill the sterile containers as they are delivered to the filler along with sterile product. The filled containers are then conveyed by an enclosed conveyor 67 to a syruper 47, such conveyor being maintained full of a sterile gas such as steam, sterile air or steam-epoxide mixture. The term "syruper" is used to indicate generally a device for adding syrup, brine or other aqueous or liquid component of the food product in desired quantity. Syrupers of known type may be employed and require no detailed description herein. Syrup or brine is supplied through a line 68. It will be understood that the syrup or brine thus added has been presterilized, as by passing it through a heat exchanger (not shown) to bring it up to a sufficient temperature and hold it at such temperature for a sufficient time to kill all spores, bacteria and enzymes as required for purposes of sterilization.

Sterile containers filled with sterile product and sterile syrup or brine, are then conveyed by an enclosed conveyor indicated generally as 69, to a sealer or closing element 44. The conveyor 69 is, of course, maintained full of sterile gas. The closing element 44 is supplied with sterile covers in the following manner: Nonsterile covers, such as vacuum or screw caps for glass jars or metal covers for tin cans, are supplied to the cover sterilizer 45 by a feed means generally indicated as 70. The covers are sterilized in the cover sterilizer similarly to the containers in the container sterilizer 41.

Sterile covers are then conveyed by an enclosed conveyor 75 (which is maintained full of sterile gas) to the sealer or closing element 44 and are applied to the containers in known manner. Sealed containers are continuously removed by a conveyor 76, to be cooled and to have labels applied.

In the system of FIGURE 4, the product sterilizer 40 and container sterilizer 41 may be provided with curtains or baffles (not shown) as in the case of the system of FIGURE 3, in which case steam will be introduced in the end spaces as a curtain.

Another variant is as follows: In the description of FIGURES 3 and 4, it has been assumed that epoxide-water vapor mixture is employed throughout the system. This is not necessary. Thus, an epoxide-water vapor mixture may be employed in the product sterilizer and in the container and cover sterilizers, and other parts of the system may be maintained in sterile condition by means of steam or other inert, sterile gas. This procedure has, in fact, the advantage that it will remove residual epoxide from containers, covers and product.

The system illustrated in FIGURE 4 is intended for food in discrete particles, such as peas and corn, which are sterilized prior to admixture with syrup or brine. The same system, with certain modifications, may be applied to the canning of liquid food products containing no discrete particles. Thus, in the case of a liquid product, such as a soup, the product sterilizer 40 illustrated in FIGURE 4 may be eliminated and, in its place, there may be substituted a conventional cooker or heat exchanger to sterilize the food by heat. For example, flash heating techniques and apparatus of known type may be used for this purpose. In such case, sterile containers sterilized in the container sterilizer 41 will pass through the conveyor 66 to the filler 42 and presterilized soup (or other liquid food product) will enter the filler through the line 69 into the sterile containers.

In the case of packaging of foods in nonrigid containers, such as Pliofilm bags, the same system as illustrated in FIGURE 4 may be used, but the cover sterilizer may be eliminated. Thus, where Pliofilm bags are employed, they will be sterilized in the container sterilizer 41; product in the product sterilizer 40; and sterile product will be placed in the Pliofilm bags in the filler 42. In such cases, there may be no need for a syruper, such as shown at 43. And since the filled bags are heat sealed, there is no need for a cover sterilizer such as shown at 45.

The description hereinabove has been with reference mainly to the employment of epoxide-water vapor (or steam) mixtures as the sterilizing medium. As mentioned above, and as shown by the graphs of FIGURES 1 and 2, epoxide mixed with water vapor is much more effective than pure epoxide. As also mentioned, pure epoxide may be used in contact with foods and other products which contain water, or with containers, covers and equipment which are wet. In such cases, water vapor-epoxide mixtures are formed in situ instead of being preformed. Preformed mixtures are, however, preferred because it is easier to control the composition of a preformed mixture (hence to maintain optimum sterilizing conditions) than to control the composition of a mixture formed in situ.

As also mentioned, it is not essential, although it is preferred, to use epoxide-water mixtures in the gaseous phase; they may be employed in the liquid phase as aqueous solutions. Thus, dry food products, containers, processing equipment and the like may be bathed in an aqueous solution of epoxide at a temperature of, say, 150 to 212° F. or higher, depending upon the boiling point of the solution and the pressure employed.

In the description hereinabove, product sterilization has been described by means of heat. Also, sterilization of solid food products has been described employing epoxide-water mixtures (gaseous or liquid). It is also quite feasible to sterilize liquid products with epoxide-water mixtures. Thus thin films of liquid product may be contacted with epoxide-water vapor mixtures at a suitably elevated temperature. Also, where the product is an aqueous liquid, epoxide vapor may be bubbled through the product, or liquid epoxide may be mixed with the product, which will then be held at an elevated temperature long enough for sterilization. The epoxide may then be removed by any suitable means, such as distillation or stripping with an inert gas.

In the systems of FIGURES 3 and 4, it is contemplated that epoxide-water mixtures be employed to sterilize the food product as well as the containers and covers. In this connection, it should be noted that special consideration may have to be given to the inactivation of enzymes, expulsion of air, setting of color and coagulation of colloid systems. These operations are well known in the art and are ordinarily carried out by heat, as in a blancher. In the practice of the present invention, food products may be pretreated to inactivate enzymes, expel air, etc., and such pretreatment may be accomplished by heat in known manner. Alternatively, the product may be sterilized and treated to inactivate enzymes, etc., all in one operation by subjecting the food product to epoxide-water mixtures. In the latter case, i.e., combined sterilization and enzyme inactivation, etc., it may be necessary to employ a higher temperature and/or a longer exposure time to accomplish, say, enzyme inactivation than to kill spores of bacteria.

It will, therefore, be apparent that a novel sterilization method has been provided which employs a chemical sterilizing medium. This method has several important advantages compared to prior methods. It is effective at relatively low temperatures and short contact times. It is applicable to the sterilization of containers, covers, food and food products and ingredients thereof, biological preparations, surgical instruments, etc. Because of the low temperatures employed in our method, it is especially adapted to use with glass containers. Also, the method does not require special equipment; because of the low temperatures involved it may be used with conventional fillers, syrupers and sealers.

We claim:
1. A method of sterilization which comprises subjecting an article to be sterilized to contact with a gaseous sterilizing medium comprising as a major active ingredient a compound having the formula

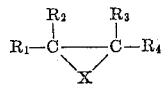

wherein $R_1$, $R_2$, $R_3$ and $R_4$ are selected from the group consisting of hydrogen, hydrocarbon radicals and halogenated hydrocarbon radicals and in which X is selected from the group consisting of oxygen and the imine group, NH; said compound having a bactericidal effect and also having a substantial vapor pressure at 212° F.; said medium also comprising at least a substantial proportion of water vapor; said contact being at a temperature not substantially greater than about 212° F. and for a time less than about 10 minutes sufficient to accomplish sterilization of heat resistant spores of NCA FS1518 and NCA PA3679.

2. The method of claim 1 wherein said medium is a gaseous mixture of a low boiling epoxide and water vapor.

3. A method of sterilizing food containers of the class consisting of metal containers and glass containers, which comprises providing a sterilizing zone, causing continuous passage of such containers through said zone and subjecting the containers, as they pass through said zone, to contact with a gaseous sterilizing medium comprising an epoxide as the major active component and water as a quantitatively minor component, such contact being for a time less than about 10 minutes and at a temperature not substantially in excess of 212° F., said time and temperature being, however, sufficient to sterilize the containers and to kill heat resistant spores of NCA FS1518 and NCA PA3679.

4. The method of claim 3 wherein said epoxide is ethylene oxide.

5. The method of claim 3 wherein said epoxide is propylene oxide.

6. A method of sterile canning of food which comprises providing container and cover sterilizing zones, providing also a filler for filling containers with food product and a closing element for applying covers to the filled containers, causing continuous passage of containers through the container sterilizing zone into the filler, filling containers in the filler with sterile food product, causing continuous passage of covers through the cover sterilizing zone into the closing element and applying covers in the closing element to the filled containers; said method also comprising maintaining sterile conditions in the filler and closing elements; said method also comprising sterilizing containers and covers as they pass through the container and cover sterilizing zones, respectively, the sterilization of the containers being accomplished by contact with a mixture of an epoxide vapor and water vapor for a time less than ten minutes and a temperature not in excess of about 212° F. sufficient to kill heat resistant spores of NCA FS1518 and NCA PA3679.

7. In the process of sterilizing articles to effect a 100% kill of heat resistant spores of NCA FS1518 and NCA PA3679, such organisms being capable of surviving heat treatment at 212° F. for periods of time in excess of 10 minutes and being capable of surviving treatment by contact with ethylene oxide vapor at normal temperatures for periods of time in excess of 20 minutes, the improvement which comprises contacting the articles with ethylene oxide in vapor form at an elevated temperature not exceeding about 212° F., said ethylene oxide vapor containing a substantial proportion of water vapor, the temperature and the proportion of water vapor being selected to effect a 100° kill of the said organisms in a period of time substantially less than twenty minutes, said process also comprising the feature of limiting contact between the humidified ethylene oxide vapor and the articles to be sterilized to a period not exceeding about ten minutes but sufficient to effect a 100% kill of said organisms.

8. The method of claim 7 wherein the articles treated are caused to move through a sterilizing zone containing the aforesaid humidified ethylene oxide vapor as the sterilizing medium, the articles are maintained at such elevated temperature, and the residence of each article in said zone is limited to a time not exceeding about 10 minutes.

9. The method of claim 8 wherein said articles are containers for food.

References Cited in the file of this patent

UNITED STATES PATENTS

| | | |
|---|---|---|
| 2,107,697 | Griffith | May 29, 1936 |
| 2,075,845 | Gross et al. | Apr. 6, 1937 |
| 2,189,948 | Griffith et al. | Feb. 13, 1940 |

OTHER REFERENCES

"Chem. Abstracts," vol. 44 (1950), pp. 6577–78, articles by Phillips and Kaye (I–IV).

The Canned Food Reference Manual, 1947, Third Edition, pub. by the American Can Company (New York), p. 304 relied on.

"The Sterilizing Action of Gaseous Ethylene Oxide" (Phillips and Kaye), American Journal of Hygiene, 1949, vol. 40, pp. 270–179 (reprint in 21–58).